F3-435 SR
12/2/86 DP H 000,180

United States Statutory Invention Registration [19]

[11] Reg. Number: H180
[43] Published: Dec. 2, 1986

Hurst et al.

[54] ASSEMBLING ARTICLES IN A TUBE

[75] Inventors: Jerry C. Hurst, Reading; John S. Rizzo, Birdsboro, both of Pa.

[73] Assignee: AT&T Bell Laboratories

[21] Appl. No.: 683,095

[22] Filed: Dec. 18, 1984

[51] Int. Cl.[4] ..... B65B 5/10; B65B 35/00
[52] U.S. Cl. ..... 53/435; 53/245; 53/475; 53/520; 53/536; 225/2; 225/96.5; 225/103
[58] Field of Search ..... 53/244, 245, 248, 252, 53/258, 261, 262, 435, 475, 520, 536, 540; 225/2, 96.5, 103

[56] References Cited

U.S. PATENT DOCUMENTS

| | | | |
|---|---|---|---|
| 1,552,648 | 9/1925 | Rosenthal et al. | 53/536 |
| 3,149,765 | 9/1964 | Horning et al. | 225/103 X |
| 4,138,835 | 2/1979 | Takayanagi et al. | 53/536 X |
| 4,204,380 | 5/1980 | Bergmann et al. | 53/520 |
| 4,220,273 | 9/1980 | Faulkner | 225/2 X |
| 4,256,527 | 3/1981 | Green | 53/520 X |
| 4,352,446 | 10/1982 | Young | 225/103 X |

*Primary Examiner*—Deborah L. Kyle
*Assistant Examiner*—Michael J. Carone
*Attorney, Agent, or Firm*—Lester H. Birnbaum

[57] ABSTRACT

A column of flat articles such as chip carrier lids (10) are assembled in a tube (35). A base (18) supports a typical row of such lids (10), each with a back surface (14) on the base (18) and a mating surface (15) facing upward. The base (18) also has an aperture (30) for passing serially downward therethrough, each lid (10) with its back surface (14) facing downward. A bracket (32) having a spring biased pin (34) and a block (38) is provided to support under the base (18) a tube (35) with an open end facing upward at the aperture (30). Plates (22, 23 and 24) are provided to guide to and introduce a lid (10) into the aperture (30) and onto any contents within the tube (35). A frictional plug (45) has fins (46) biased between opposing walls of the tube (35) to yieldably resist downward movement within the tube (35). In a place and push operation, an upwardly biased pusher (48) has a pin (53) to urge a lid (10) and any contents in the tube (35) downward a distance sufficient to provide space for a subsequent lid (10) in aperture (30).

8 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

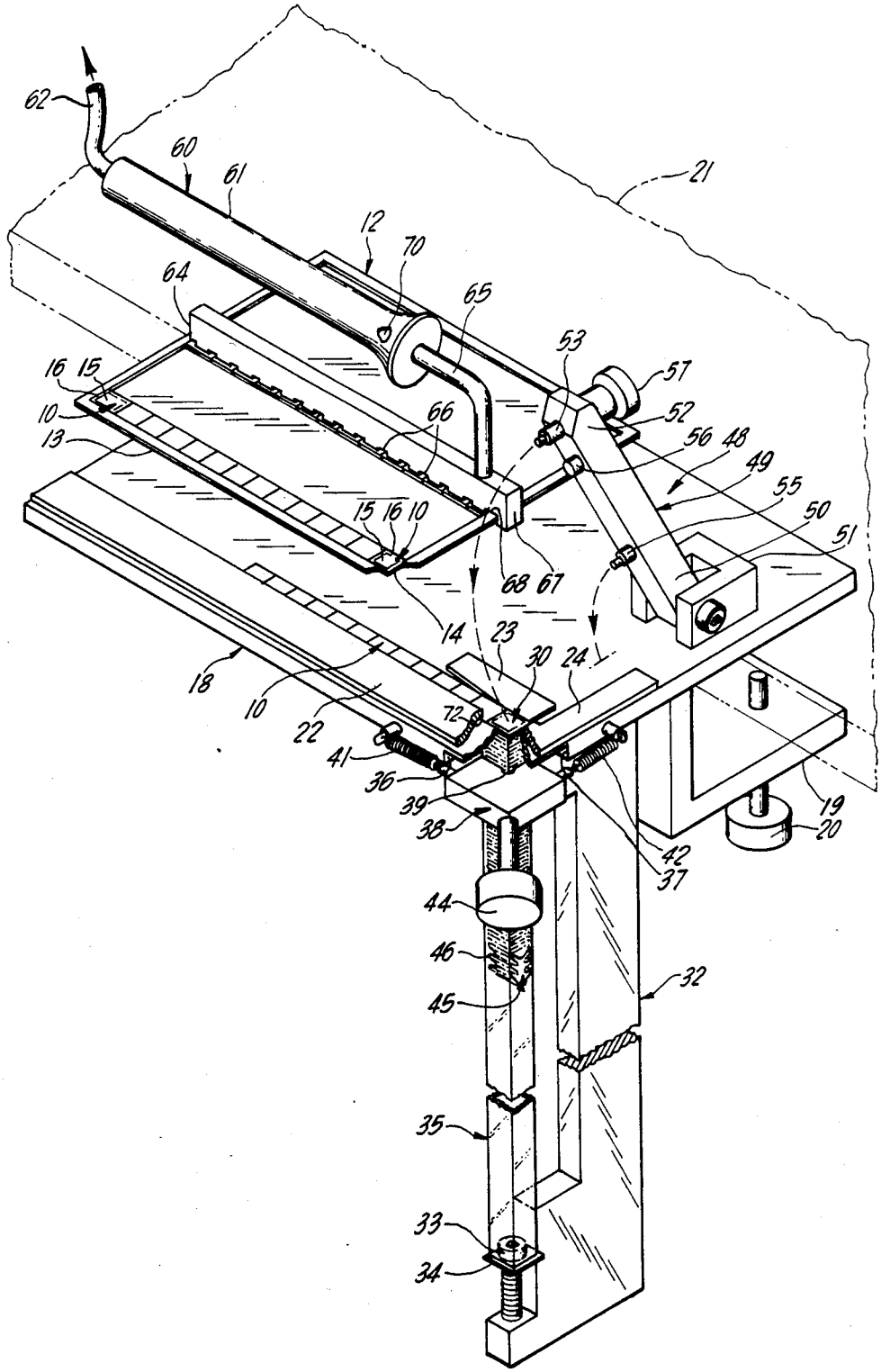
62
60
61
21
12
70
64
65
53
57
16
15
10
13
66
52
56
48
49
55
50
51
15
16
10
68
67
14
23
30
24
18
10
22
72
41
36
39
38
42
37
19
20
44
46
45
32
35
33
34

ASSEMBLING ARTICLES IN A TUBE

TECHNICAL FIELD

This invention relates to assembling articles in a tube. More particularly, the invention relates to assembling in a tube, a column of substantially flat articles such as lids for semiconductor chip carriers.

BACKGROUND OF THE INVENTION

Thin, substantially flat articles are difficult to handle, especially if they are small, light in weight and vulnerable to physical damage. It is conventional, although tedious, to handle such articles with manual tweezers. For example, if a flat article rests on a flat surface, it is tedious to insert a tip of a tweezer under the article. After pickup, excess finger pressure on the tweezer may cause gouges and scratches in either of two major surfaces of the article.

The electronics industry is typical of a field where such thin, substantially flat articles are encountered. For example, lids on chip carriers may be only about 6 to 10 mm square, about 0.15 to 0.25 gram in weight and may have a delicate bonding frame on a major surface. Such lids are assembled to chip enclosures in multiple arrays in semiautomatic machines. The lids and enclosures are fed into the machines and one of each are registered and clipped together for reflow bonding. A problem is to handle the lids for loading in an efficient manner without damaging the bonding frame.

In a presently popular technique, the lids are handled in tubular magazines, often called sticks. The tubes are typically square in cross section, about 25 to 30 cm long and have initially open ends. Caps or plugs may be utilized to close the ends after the tubes are loaded with a column of lids. A problem is to load the lids, all facing in the same direction, with back-to-front contact of major surfaces in a tube.

The lids are typically made from a thin sheet of metal alloy or ceramic material which is later severed into individual portions. A frame of bonding material may be applied to each lid portion before or after separation from other lids. When completed, the lids lie in an edge-to-edge array, typically with bonding surfaces facing upward in a flat tray. Heretofore, tweezer tools or vacuum probes were typically utilized to manually load the lids, one at a time, into the tubes. It will be appreciated that such loading is inefficient, expensive and risky to bonding frames.

Accordingly, it is desirable to provide new and improved expedients for assembling articles, especially flat articles, in a tube. Lids for chip carriers are exemplary of flat articles requiring special handling because they are small, light in weight and often brittle. Expedients are needed to efficiently assemble such lids, one at a time, preferably in a vertically disposed tube.

SUMMARY OF THE INYENTION

Expedients are provided for assembling in a tube, a column of flat articles such as chip carrier lids, having first and second major surfaces. A base supports a plurality of the lids, each having a second major surface, such as a plain back surface, on the base. A first major surface of each lid, such as a mating surface with a bonding frame, faces upward. The base also has an aperture of a size and shape to pass serially downward therethrough, ones of the lids, each having its back surface facing downward.

In a first embodiment, the tube is supported under the base with an open end facing upward and registered to the aperture. Guides are associated with the base for introducing a lid into the aperture and onto any contents within the tube.

In another embodiment, the lids are yieldably supported as they are serially assembled in the tube. A lid introduced into the aperture is held at the open end of the tube and free fall of such a lid in the tube is prevented.

In another embodiment, a lid and any contents under such lid in the tube are urged downward a distance sufficient to provide space for a subsequent lid in the aperture.

BRIEF DESCRIPTION OF THE DRAWING

The invention will be more readily understood from the following detailed description when read in conjunction with the accompanying drawing. The drawing shows a pictorial view of apparatus for assembling flat lids in a tube in accordance with an embodiment of the invention. Some elements in the drawing are broken away for clarity. Other elements are abbreviated or simplified to highlight certain features of the invention.

DETAILED DESCRIPTION

The Articles

The drawing shows a plurality of substantially flat articles 10 which may be assembled in the practice of the invention. For purposes of illustration and discussion, the article 10 shown will also be referred to herein as a chip carrier lid 10 or merely as a lid 10. However, the invention should not be understood as referring only to chip carrier lids or only to lids in general. It is believed that the invention is reasonably applicable to a broad range of substantially flat articles which may be desirably handled in a tube. Also, it is believed that the invention applies to other articles which may not be square or even rectangular. For example, other polygonal or even circular articles could as well be assembled in a tube in accordance with the invention. Chip carrier lids 10 are a challenge because they are small, light in weight and have features which are vulnerable to damage.

The illustrative lid 10 is typically made of a gold plated metal or a ceramic material such as alumina. An often preferred metal lid 10 has a separate frame of solder affixed to the lid by spot attachment at the corners. Ceramic lids 10 may have a frame of glass frit or solder adhered by masking and deposition methods. Some of the solder frames are especially fragile and require special handling. Some of the ceramic lids are brittle and do not tolerate stresses caused by bending or impact. Accordingly, it is desirable to avoid mechanical abrasion, bending and impact such as by free falling onto apparatus or other lids.

The illustrative lids 10 are utilized to cover box-like enclosures known as chip carriers (not shown). A device is enclosed, such as an integrated circuit chip which is elecrically connected to external pads on the carrier. The lids 10 are configured, and bonding frames thereon are designed for registration to a metallized seat on the carrier. After being assembled, the lids 10 and carriers are reflow bonded together such as by passage through a furnace. A problem is to handle the lids 10 in an efficient manner, after they are fabricated and until they are assembled to carriers.

Assembling Lids in a Tube

The drawing shows a tray 12 containing a supply of lids 10, typical of a condition in which such lids are supplied. The tray 12 may be made of a plastic sheet and have peripheral flanges, such as a forward flange 13, for handling and retaining the lids 10. Each lid 10 rests on its major back surface 14 and has a major surface 15 facing upward which has a bonding frame 16 for mating to a chip carrier (not shown).

The tray 12 is supported on a flat base 18 which may be clamped to a bench top 21 (shown in phantom lines) utilizing a bracket 19 and one or more knurled studs 20. Base 18 may have guide members 22, 23 and 24 to facilitate moving one or more lids 10 to an aperture 30. Aperture 30 is of a size and configuration to pass downward therethrough, individual lids 10, each having a major back surface 14 facing downward.

From base 18, there is suspended a bracket 32 having a spring biased pin 33 and a plate 34 to support a removable, replaceable tube 35. A top, open end of a tube 35 faces upward and is registered to the underside of aperture 30. Recessed walls 36 and 37 are provided in base 18 to locate a tube 35. A block 38 having an inside corner 39 also locates tube 35 and biases the same against walls 36 and 37. Block 38 is biased against base 18 by coil springs 41 and 42 which oppose pulling force applied to a manual knob 44. When replacing a tube 35, one merely urges the tube downward against support plate 34 and pin 33 and pulls knob 44. The tube 35 is freed from the aperture 30 and an empty tube may be inserted by repeating the action.

It will be appreciated that dropping the lids 10 individually or in piles into a tube 35 would be contraindicated in achieving an orderly assembly in the tube. The lids 10 would tend to become disorganized and free fall of one or more lids with consequent impact would be destructive of lids or lid features. Accordingly, the invention includes a place-and-push method of assembling articles in a tube. For this method, the articles are yieldably supported in a tube 35 which is assumed in the drawing to be made of a transparent plastic for illustration purposes.

A presently preferred device for yieldably supporting lids 10 is a frictional plug 45. Plug 45 has lateral fins 46 which are biased between and against opposing walls of tube 35. Plug 45 is peferably made of a flexible material such as rubber or some other elastomer. The fins 46 are preferably deflected upward as shown in tube 35. Plug 45 then resists movement downward to a lesser degree that it resists movement upward.

To urge a lid 10 downward upon the plug 45 and any lids 10 ("the contents") in tube 35, a pusher mechanism 48 is provided which resembles a telegraph, signal-sending key. Pusher 48 is adapted to avoid contacting bonding frames on the lids 10. Pusher 48 is provided to urge an article 10, and any contents under such article in the tube 35, downward a distance sufficient to provide space for a subsequent article in the aperture 30.

Pusher 48 includes a lever 49 having a first end 50 pivotally mounted by a yoke 51 to the base 18. Lever 49 has a second end 52 containing a push pin 53 which is arcuately engageable to an article 10 in aperture 30. The second end 52 of lever 49 is spring biased upwardly away from the base 18 by action of a plunger 55. Lever 49 also has an adjustable travel stop 56 to limit downward movement against base 18 and consequent movement of pin 53 against an article 10 being urged into a tube 35. One adjusts stop 56 to account for the travel required to overcome resistance by plug 45 to urge an article 10 into tube 35 and provide for a subsequent article in aperture 30.

It will be appreciated that provision for a subsequent article requires only that the contents in the tube 35 be moved downward a distance equal to the thickness of one lid 10. However, it may be found more efficient to move slightly more than such thickness to provide for any resiliency of a plug 45. Also, it is noted that a pin 53 may be shaped to avoid bonding frames and be made of a resilient material to soften impact on lids 10. Such resiliency may also require an adjustment to travel stop 56. It is incidentally noted that lever 49 is shown upwardly disposed for illustration. In actual use, end 52 is normally set downward on base 18 so one merely taps a knob 57 to urge a lid 10 downward in aperture 30 and tube 35.

Operation

In operation of the illustrative, article assembly apparatus, one or more lids 10 are moved from tray 12 onto base 18. A plurality of lids 10 are preferably moved in a row onto the base 18. One method of moving a row is to simply use a cutter such as a conventional paper cutter (not shown) to remove front flange 13 from tray 12. Then a straight tool (not shown) may be used to scrape a row of lids out of tray 12 and onto base 18.

Another method of moving a row of lids 10 is to utilize a multiported vacuum tool 60 shown in the drawing. Tool 60 has a hollow handle 61 connected to a vacuum source (not shown) by a tube 62 and also connected to a manifold 64 by a rigid tube 65. Manifold 64 has ports (not shown) spaced by recesses 66 to conform to the spacing of lids 10 in tray 12. Manifold 64 also has a pusher end 67 separated from the ports by an extended recess 68. To lift a row of lids 10, one applies a thumb over a relief aperture 70 on the tool 60, after first aligning to and contacting such row of lids. When aperture 70 is sealed off, the vacuum source draws through the ports and each port attracts one of the lids 10. The row is transferred onto the base 18 and urged against the guide 22 which has an advantageous undercut, longitudinal recess 72 to guide the lids 10. Then the aperture 70 is again opened to relieve the vacuum in manifold 64 and the tool 60 is free of the row of lids 10. The forward end 67 may be used to urge the row of lids 10 toward the aperture 30.

Note that guides 22, 23 and 24 cooperate to align a leading lid 10 over and introduce the same into the aperture 30. The plug 45 yieldably supports the contents of tube 35 from downward movement so there is preferably space for about one article when a lid 10 readily assumes a flat posture with its back surface 14 downward upon the contents of tube 35.

In practice, it is found that one readily reciprocates pusher 48 as the lids 10 are advanced and the lids become safely and orderly assembled in tube 35 as the frictional plug 45 is moved downward. When tube 35 is full, it is removed by depressing plate 34, pulling on knob 44 and extracting the tube for capping. It is typically found that about 400 lids and a plug 45 fill a tube about 25 cm long. Assembling such a quantity of lids manually typically takes about 90 minutes while doing so with the illustrative embodiment of the invention takes about 20 minutes.

The illustrated apparatus has found further utility in separating lids 10 while they are still interconnected. Lids 10 are sometimes cut into rows but are still unidirectionally interconnected; for example, interconnection boundaries between lids in a row may be scored but not broken. In such case, a row of lids may be guided such that a leading lid 10 is introduced over, but such a lid will not fall into, aperture 30 without urging. Push pin 53 is then lightly contacted to the leading lid to break the same away from a trailing lid 10. The separated lid is introduced into aperture 30 and urged downward with any contents in the tube 35. Undercut recess 72 is found to be of convenient utility in restraining a row of lids 10, and particularly a trailing lid 10, when a leading lid is broken from a row.

The means for urging a lid 10 downward is described herein primarily as a push pin 53. However, it is within the scope of the invention to replace or supplement pin 53 with urging means amenable to severing a leading lid 10 from a trailing lid 10. For example, the end 52 could as well be fitted with cutting means such as a knife or a taut wire device to facilitate the separating function and enhance the urging step.

There have been illustrated herein certain practical embodiments and applications of the invention. Nevertheless, it is to be understood that various modifications and refinements may be made and used which differ from the disclosed embodiments without departing from the spirit and scope of the present invention.

What is claimed is:

1. Apparatus for assembling in a tube having opposing walls, a column of flat articles having first and second major surfaces and initially in the form of an interconnected row of such articles, comprising:

a base for supporting the interconnected row of the articles, each interconnected article having its second major surface on the base and its first major surface facing upward, said base also having an aperture of a size and shape to pass serially downward therethrough, ones of the articles, each having its second major surface facing downward;

means for removably supporting the tube under the base with an open end facing upward and registered to the aperture;

means associated with the base for guiding to and introducing a leading article of the interconnected row over the aperture;

means for breaking the leading article away from a trailing article in the row so that the leading article is introduced into the aperture and urged downward a distance sufficient to provide space for a sebsequent article; and frictional means for yieldably supporting the articles as they are serially assembled into the tube such that an article introduced into the aperture is held at the open end of the tube and free fall of such article in the tube is substantially prevented.

2. Apparatus as in claim 1 wherein the means for yieldably supporting the articles in the tube further comprise:

a frictional plug having means biased between and against opposing walls of the tube to yieldably resist downwardly directed forces on the plug within the tube.

3. Apparatus as in claim 2 wherein the means for breaking and urging the article downward, further comprise:

a lever having a first end pivotally mounted to the base and a second end containing a push pin arcuately engageable to an article in the aperture, said second end being spring biased upwardly away from the base and having an adjustable travel stop to limit downward movement of the push pin against an article being urged into the tube.

4. Apparatus as in claim 3 wherein the guiding means include a member having a longitudinally extending, undercut lip to restrain edges of articles so a leading article may be readily broken away from a trailing article.

5. A method of assembling in a tube having opposing walls, a column of flat articles, each having first and second major surfaces and initially in the form of an interconnected row of such articles, comprising:

supporting on a base the interconnected row of the articles, each article having its second major surface on the base and its first major surface facing upward, said base also having an aperture of a size and shape to serially pass downward therethrough, ones of the articles, each having its second major surface facing downward;

removably supporting the tube under the base with an open end facing upward and registered to the aperture;

guiding to and introducing a leading article over the aperture;

striking the leading article to separate it from a trailing article in the row so that it is introduced into the aperture, and urging the article downward a distance sufficient to provide space for a subsequent article;

yieldably supporting, with frictional means, the articles as they are serially assembled into the tube such that an article introduced into the aperture is held at the open end of the tube and free fall of such article in the tube is prevented.

6. A method as in claim 5 wherein the yieldably supporting step further comprises:

disposing at a desired level within the tube a frictional plug having means biased between and against opposing walls of the tube to yieldably resist downwardly directed forces on the plug within the tube.

7. A method as in claim 6 wherein the article urging step further comprises;

actuating a lever having a first end pivotally mounted to the base and a second end containing a push pin arcuately engageable to an article in the aperture, said second end being spring biased upwardly away from the base and having an adjustable travel stop to limit downward movement of the push pin against an article being urged into the tube.

8. A method as in claim 5 wherein the trailing article is restrained under a longitudinally extended undercut recess of a guide member while the leading article is being broken away.

* * * * *